(12) United States Patent
Fuechtner et al.

(10) Patent No.: US 8,439,147 B2
(45) Date of Patent: May 14, 2013

(54) MOTOR VEHICLE

(75) Inventors: Martin Fuechtner, Stuttgart (DE); Joerg Meyer-Ebeling, Stuttgart (DE)

(73) Assignee: Dr. Ing. H.C.F. Porsche Aktiegesellschaft (DE)

( * ) Notice: Subject to any disclaimer, the term of this patent is extended or adjusted under 35 U.S.C. 154(b) by 0 days.

(21) Appl. No.: 13/579,480

(22) PCT Filed: Dec. 9, 2010

(86) PCT No.: PCT/EP2010/007499
§ 371 (c)(1),
(2), (4) Date: Aug. 16, 2012

(87) PCT Pub. No.: WO2011/103899
PCT Pub. Date: Sep. 1, 2011

(65) Prior Publication Data
US 2012/0312621 A1    Dec. 13, 2012

(30) Foreign Application Priority Data

Feb. 23, 2010   (DE) .......................... 10 2010 009 875

(51) Int. Cl.
*B60K 17/356*    (2006.01)
(52) U.S. Cl.
USPC ....................................... 180/243

(58) Field of Classification Search ............. 180/233, 180/243
See application file for complete search history.

(56) References Cited

U.S. PATENT DOCUMENTS

| | | | |
|---|---|---|---|
| 6,718,948 | B2 | 4/2004 | Vahle et al. |
| 2008/0196957 | A1 | 8/2008 | Koike et al. |
| 2009/0242289 | A1 | 10/2009 | Murty |
| 2009/0315359 | A1 | 12/2009 | Suzuki et al. |

FOREIGN PATENT DOCUMENTS

| | | |
|---|---|---|
| DE | 102 16 246 | 10/2003 |
| DE | 10 2006 041 160 | 9/2008 |
| EP | 2 172 356 | 4/2010 |
| WO | 2009/014354 | 1/2009 |

*Primary Examiner* — Tashiana Adams
(74) *Attorney, Agent, or Firm* — Gerald E. Hespos; Michael J. Porco; Matthew T. Hespos

(57) ABSTRACT

The invention relates to a motor vehicle, comprising a body and a drive train, wherein the drive train comprises a front axle (10), a rear axle (13), a drive unit, and a gearbox (20), wherein the drive unit is designed as a hybrid drive having an internal combustion engine (16) and at least one electric machine (17, 18, 19), wherein the internal combustion engine (16) can be supplied with fuel from at least one fuel tank (21), and wherein the or each electric machine (17, 18, 19) can be supplied with electrical energy from at least one electrical energy store (22) in motorized operation, and wherein the or each fuel tank (21) and the or each electrical energy store (22) are positioned in a common section (23) of the body.

7 Claims, 1 Drawing Sheet

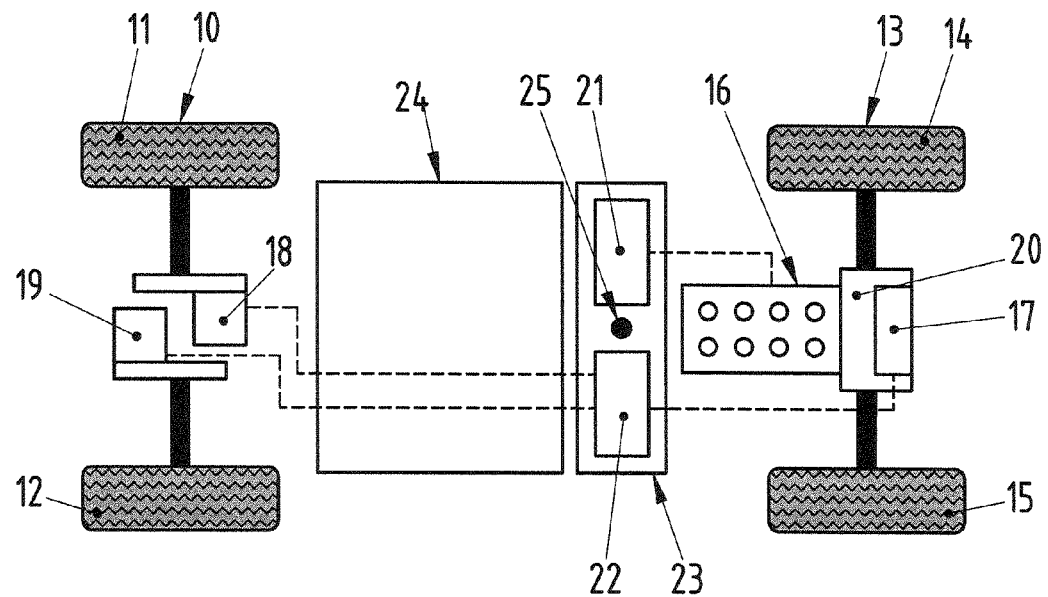

ical embodiments of the invention, without being restricted
MOTOR VEHICLE

BACKGROUND OF THE INVENTION

1. Field of the Invention

The invention relates to a motor vehicle with an internal combustion engine supplied with fuel from a fuel tank and at least one electric machine supplied with electric energy from at least one electric energy accumulator.

2. Description of the Related Art

The basic components of a motor vehicle are what is referred to as a body and a drive train. The body is essentially defined by a motor vehicle body which customarily provides a passenger compartment, an engine compartment and a luggage compartment. The drive train of a motor vehicle comprises a front axle, a rear axle, a drive unit and a transmission.

SUMMARY OF THE INVENTION

This invention relates to a motor vehicle, comprising a body and a drive train, the drive unit of which is designed as a hybrid drive. A hybrid drive comprises an internal combustion engine and at least one electric machine. The internal combustion engine of the hybrid drive is suppliable with fuel from at least one fuel tank. The or each electric machine of the hybrid drive is suppliable with electric energy from at least one electric energy accumulator in the motor mode. In the generator mode of the or each electric machine, the or each electric energy accumulator can be charged by the electric machine. In the case of motor vehicles known in practice, the or each fuel tank and the or each electric energy accumulator are positioned in different sections of the body.

Taking this as the starting point, the present invention is based on the problem of providing a novel motor vehicle. This problem is solved by a motor vehicle according to patent claim 1. According to the invention, the or each fuel tank and the or each electric energy accumulator are positioned in a common section of the body.

In the motor vehicle according to the invention, the or each fuel tank and the or each electric energy accumulator are positioned in a common section of the body. This affords a multiplicity of advantages. A main advantage is that a standard design for a motor vehicle is possible irrespective of the specific configuration of the or each fuel tank and of the or each electric energy accumulator and the specific number thereof.

Accordingly, it is possible, without modifying the body, to select the or each fuel tank and the or each electric energy accumulator depending on the customers' requirements and to position them in the common section of the body.

The common section of the body, in which the or each fuel tank and the or each electric energy accumulator are positioned, is preferably positioned in the vicinity of a center of gravity of the motor vehicle. Advantages in terms of driving dynamics are afforded whenever the common section of the body, in which the or each fuel tank and the or each electric energy accumulator are positioned, is positioned in the vicinity of the center of gravity of the motor vehicle, since the driving performance is not affected by a changing filling volume of the or each fuel tank.

According to an advantageous development of the invention, the or each fuel tank and the or each electric energy accumulator are jointly coolable. By cooling the or each fuel tank and therefore the fuel kept ready in the respective fuel tank, the motor vehicle power can be increased. The joint cooling of the or each fuel tank and of the or each electric energy accumulator permits a reduced outlay on cooling and a simplified design of a cooling system.

Preferred embodiments of the invention emerge from the dependent claims and the description below. Exemplary embodiments of the invention, without being restricted thereto, are explained in more detail with reference to the drawing.

BRIEF DESCRIPTION OF THE DRAWING

FIG. 1 shows a schematized illustration of a motor vehicle according to the invention.

DETAILED DESCRIPTION OF THE PREFERRED EMBODIMENT

This invention relates to a motor vehicle. The invention is described in detail below with reference to FIG. 1, wherein FIG. 1 shows a preferred exemplary embodiment of a motor vehicle according to the invention. A motor vehicle has a body and a drive train.

Of the drive train of the motor vehicle, FIG. 1 shows a front axle 10 with two front wheels 11, 12 and a rear axle 13 with two rear wheels 14 and 15. The drive train according to FIG. 1 furthermore has a drive unit, which is designed as a hybrid drive, with an internal combustion engine 16 and, in the exemplary embodiment shown, with a plurality of electric machines 17, 18 and 19.

The internal combustion engine 16 of the hybrid drive and the electric machine 17 are assigned to the rear axle 13 and, according to FIG. 1, enter the rear axle 13 via a transmission 20. In the preferred exemplary embodiment which is shown, the internal combustion engine 16 is a spark-ignition internal combustion engine with eight cylinders in a V construction, wherein the internal combustion engine 16 is positioned in a mid-engine construction between the front axle 10 and the rear axle 13, namely to the rear of the front axle 10 and in front of the rear axle 13. In the preferred exemplary embodiment, the transmission 20 is a twin clutch transmission in which the electric machine 17 is integrated.

In the exemplary embodiment shown in FIG. 1, the two electric machines 18 and 19 are assigned to the front axle 10 in such a manner that the electric machine 18 serves to drive a first front wheel 11 of the front axle 10 and the electric machine 19 serves to drive a second front wheel 12 of the front axle 10.

The internal combustion engine 16 of the hybrid drive is suppliable with fuel from at least one fuel tank 21. A single fuel tank 21 is shown in FIG. 1. However, there may also be a plurality of fuel tanks. The electric machines 17, 18 and 19 are suppliable with electric energy from at least one electric energy accumulator 22 in the motor mode of said electric machines. FIG. 1 shows a single electric energy accumulator 22, but there may also be a plurality of electric energy accumulators.

Within the context of the present invention, the fuel tank 21 and the electric energy accumulator 22 are positioned in a common section 23 of the body of the motor vehicle. Whenever a plurality of fuel tanks and/or a plurality of electric energy accumulators are present, said fuel tanks and/or electric energy accumulators are likewise positioned in the common section 23 of the body of the motor vehicle.

According to the invention, a common section 23 or region is accordingly kept ready in the body of the motor vehicle for positioning the or each fuel tank 21 and the or each electric energy accumulator 22.

The common section 23 serving to jointly accommodate the or each electric energy accumulator 22 and the or each fuel tank 21 is positioned, according to FIG. 1, between the front axle 10 and the rear axle 13, namely to the rear of the front axle 10 and in front of the internal combustion engine 16.

It can furthermore be gathered from FIG. 1 that said common section 23, in which the or each fuel tank 21 and the or each electric energy accumulator 22 are jointly positioned, is positioned to the rear of a passenger compartment 24 of the body of the motor vehicle and in front of the internal combustion engine 16.

The subassemblies positioned in the common section 23 of the body, i.e. the or each fuel tank 21 and the or each electric energy accumulator 22, are preferably jointly coolable. At the same time as the cooling of the or each electric energy accumulator 22, the fuel tank 21 can accordingly be cooled. By this means, the fuel kept ready in the respective fuel tank 21 is cooled, and therefore cooled fuel can be supplied to the internal combustion engine 16 in order thereby to increase the power of the internal combustion engine 16. With joint cooling of the electric energy accumulator 22 and the fuel tank 21, the design of a cooling system can be simplified, since separate cooling circuits for the electric energy accumulator 22 and fuel tank 21 are not required.

The common section 23, and therefore the or each fuel tank 21 positioned in the common section 23, and the or each electric energy accumulator 22 positioned in the common section 23 are preferably positioned in the vicinity of a center of gravity 25 of the motor vehicle. The configuration in which the center of gravity 25 drops into the common section 23 is particularly preferred, since, in particular, the motor vehicle properties relating to driving dynamics can thereby be optimized.

The or each electric energy accumulator 22 positioned in the common section may be designed as a flywheel accumulator or battery depending on the specific configuration of the motor vehicle.

Flywheel accumulators are used whenever emphasis is placed on performance or a power-oriented driving performance. Batteries are used whenever emphasis is placed on a fuel-reduced or range-maximized driving performance.

The or each fuel tank 21 and the or each electric energy accumulator 22 are preferably positioned in the common section 23 of the body as a unit of modular construction. By this means, the motor vehicle can be configured with regard to the type, number and size of the or each fuel tank 21 and the or each electric energy accumulator 22 individually for the customers without modifications to the body.

The invention claimed is:

1. A motor vehicle, comprising a body and a drive train, the drive train having a front axle, a rear axle, a drive unit and a transmission, the drive unit being a hybrid drive with an internal combustion engine and at least one electric machine, the internal combustion engine being suppliable with fuel from at least one fuel tank, and the electric machine being suppliable with electric energy from at least one electric energy accumulator in the motor mode, the fuel tank and the electric energy accumulator being positioned in a common section of the body, the internal combustion engine being arranged in a mid-engine arrangement rearward of the front axle and forward of the rear axle and rearward of the common section of the body, in which the fuel tank and the electric energy accumulator are positioned.

2. The motor vehicle of claim 1, wherein the at least one electric machine comprises at least one electric machine comprises at least one electric machine assigned to the front axle.

3. The motor vehicle claim 1, characterized in that wherein the at least one electric machine comprises at least one electric machine assigned to the rear axle.

4. The motor vehicle of claim 1, wherein the fuel tank and the electric energy accumulator are jointly coolable.

5. The motor vehicle of claim 4, wherein the fuel tank and the electric energy accumulator are positioned as a unit of modular construction in the common section of the body.

6. The motor vehicle of claim 1, wherein the electric energy accumulator is a flywheel accumulator.

7. The motor vehicle of claim 1, wherein the electric energy accumulator is a battery.

* * * * *